United States Patent [19]

Austin

[11] 4,309,534
[45] Jan. 5, 1982

[54] RENATURED CHITOSAN AND PROCESS OF MAKING SAME

[75] Inventor: Paul R. Austin, Wilmington, Del.

[73] Assignee: University of Delaware, Newark, Del.

[21] Appl. No.: 12,505

[22] Filed: Feb. 15, 1979

[51] Int. Cl.$^3$ .......................... C08B 37/08; C08L 5/08
[52] U.S. Cl. ...................................... 536/20; 106/162; 264/186; 264/330
[58] Field of Search .................. 106/203, 162; 536/20; 264/186, 330

[56] References Cited

U.S. PATENT DOCUMENTS

| | | | |
|---|---|---|---|
| 2,040,879 | 5/1936 | Rigby | 536/20 |
| 2,795,579 | 6/1957 | Doczi | 536/20 |
| 4,059,457 | 11/1977 | Austin | 536/20 |

*Primary Examiner*—Allan Lieberman

[57] ABSTRACT

Renatured chitosan having an optical rotation in solution that is at least 20% more negative than that of untreated chitosan and the process of making same. The process for preparing such renatured chitosan is accomplished by aging a solution of chitosan in an aqueous acid at a pH of about 2.0 to 5.5. It is preferred to age the solution at room temperature for about 2 to 14 days until the optical activity shifts toward the negative by at least about 20%.

5 Claims, No Drawings

RENATURED CHITOSAN AND PROCESS OF MAKING SAME

This invention relates to solutions of chitosan and to films and fibers having superior use properties prepared therefrom.

Chitosan is made from chitin, an aminocellulose derivative that occurs widely in nature, for example in the cell walls of fungi, bovine cartilage, cuttlefish bone and the hard shells of insects and crustaceans. Wastes from the shrimp, lobster and crab seafood industries contain 10–30% chitin and are potentially important sources of chitin and chitosan. Chitin is a mucopolysaccharide, believed to be poly-N-acetyl-D-glucosamine, with an empirical formula $(C_8H_{13}O_5N)_n$ in which n may be any number from say 100 into the thousands range.

Chitosan is deacetylated chitin and is made by hydrolysis of chitin with strong alkali at elevated temperatures. It is insoluble in water. However, because of a plurality of amine groups it is soluble in many dilute acids. Natural chitin has a levo (−) optical rotation, believed to be beneficial in certain uses. Therefore it also is desirable, during hydrolysis, not to change the natural conformation and optical activity of the polymer any more than necessary. However, because of the severe conditions of hydrolysis, the resulting chitosan usually has an optical activity of smaller levo (−) value than the parent chitin, or even a marked dextro (+) value.

For biological and physiological purposes it is recognized that the native conformation of a biopolymer is usually required. For example, chitosan powders having a natural conformation and highly negative optical rotation are desired for topical wound-healing treatments. Further, since most chitosans have a positive or only a slight negative optical rotation it is difficult to obtain chitosan films with marked levorotatory properties, as desired at times in optics for balancing or pairing with films having a dextro rotation. Hence, there was a need for a method of inverting the molecular conformation and optical activity of chitosan in a controlled manner to products having predictable optical rotatory properties. Such a product has been named "renatured" chitosan. In other words, "renatured" chitosan is chitosan which has been in solution and has negative optical rotation and crystallinity.

PRIOR ART

The solvent systems of U.S. Pat. No. 4,059,457 (DMAc/LiCl) provide an environment for inversion of at least a portion of the optical activity of chitin, but this system is not a solvent for chitosan.

Solutions of chitosan in aqueous acids generally, and in various specific aqueous acids, were disclosed by Rigby (U.S. Pat. No. 2,040,880) and by Hercules, Inc. (Bulletin CMP-101), but without any mention of inversion of optical activity. Since only short solution times are given, inversion would not have occurred to any significant extent. Since it is well known that in acid systems glycoside linkages hydrolyze readily, one skilled in the art would assume that one should allow chitosan to remain in solution for the least possible time to avoid serious hydrolytic degradation of the polymer.

OBJECTS

It is an object of this invention to provide a method for the optical inversion of chitosan.

It is a further object to provide relatively viscosity-stable solutions of levorotatory chitosan which can be filtered or centrifuged to purify them and which can have their properties measured.

It is still another object to provide solutions of chitosan from which the chitosan can be renatured in the form of films, fibers, powders or other shaped objects.

It is a further object to provide chitosan solutions that are able to convert certain dextro-rotatory and mildly levorotatory chitosans to a natural levorotatory form.

Another object is to provide chitosan films with controlled polarizing properties.

SUMMARY OF THE INVENTION

In spite of the tendency to hydrolyze the chains and reduce viscosity, controlled optical inversion of chitosan to useful products has been discovered to be possible, surprisingly without undue hydrolytic degradation of the polymer.

It has now been found that chitosan in solution under controlled conditions in many aqueous acids undergoes optical inversion upon standing at room temperature for a period of a few days to a few weeks. An aqueous acid solution of chitosan having a pH between about 2.0 and 5.5, and preferably in the range of 2.3–4.9, shows marked changes in optical activity toward the negative. Many solutions having initial positive optical activities invert to negative values, and some having negative values change to more negative values. In a condition showing more negative optical activity chitosan is in a more natural form, and so is called "renatured."

Aqueous acetic acid of 1–2% strength is the most preferred solvent. Also preferred are an aqueous acetic acid-sodium acetate buffer solution, 1–2% aqueous glycollic acid or 1% aqueous pyruvic acid. In addition the following aqueous acids are useful: formic, propionic, malonic, succinic, adipic, malic, lactic, citric, and tartaric acids.

For physical property determination, dilute acid solutions of chitosan at weight/volume concentrations of 0.5, 1.0 or 2.0% can be employed. For film and filament preparation by wet-casting and spinning technology, higher concentrations of 4–5% w/v are preferred. The shaped films or fibers are subsequently prepared by evaporation or by neutralization, or by immersion in acetone, methyl ethyl ketone, methanol, 2-propanol or other non-solvent for the chitosan. The resulting films and fibers are pliable and strong and can be stretched to improve their properties.

Chitosan made from chitin from various sources and by various processes behaves differently with respect to solubility, viscosity of the solution, initial optical activity and the rate and amount of inversion. For example, chitosans from brown shrimp and Dungeness crab dissolve readily in several aqueous acids, while an acetic acid solution of pink shrimp chitosan prepared under different conditions is so cloudy that viscosity measurement is unreliable and optical activity cannot be determined. The inversion behavior of chitosans from different sources and preparational histories is illustrated in the following table.

| | Optical Activity of Chitosan | |
|---|---|---|
| | Specific Rotation | |
| Source | Initial | after 1 week |
| Brown shrimp-low visc. | −10 | −25 |
| Brown shrimp-med visc. | −15 | −25 |

-continued

| | Optical Activity of Chitosan | |
|---|---|---|
| | Specific Rotation | |
| Source | Initial | after 1 week |
| Brown shrimp-high visc. | −33 | −40 |
| Dungeness crab | +25 | −16 |

The more negative optical activities of the brown shrimp varieties probably are attributable partly to milder conditions of isolation of the chitin, and partly to milder hydrolysis in preparing the chitosan.

Chitosan from various sources, in addition to those shown in the table, can be used with the solvent systems of this invention. These sources include red, blue, rock, and king crabs, krill, lobsters, shrimp and other crustaceans, and the cell walls of fungi and the hard shells of insects.

In addition to solution studies, illustrating how chitosan can be renatured to the desired extent in predictable fashion, formation of films and filaments also has been investigated. These studies showed that renatured chitosan films can act as light retardation plates in conjunction with a polarizing film which improves the contrast in viewing light-colored marks on mirrored surfaces at certain reflected angles. Hence, these films are expected to be useful as light filters to improve contrast in photography, and also as components of the glass in automobile windshields and headlights to reduce glare. Tough, strong stretched filaments were also obtained.

Since the above-mentioned properties are affected by the degree of renaturing, the process of this invention provides a convenient and reliable way to prepare chitosan of the quality needed for a given purpose.

EXAMPLE 1

In 100 parts of distilled water 2 parts of dry, low viscosity, granular chitosan derived from brown shrimp shells are dispersed uniformly. Then 100 parts of 2% aqueous acetic acid are added and stirring is continued at room temperature for about 20 minutes. The pH of the clear solution is 3.98, viscosity is 18.25 cps. at 23° C. and its specific rotation is −10.0. After standing 1 week at room temperature, the specific rotation is −25.0.

EXAMPLE 2

Using the procedure of Example 1, a 0.5% w/v solution is made of a high viscosity brown shrimp chitosan in 1% aqueous acetic acid. The solution pH is 3.68, the viscosity in 286 cps. at 27° and the specific rotation is −33.0. After standing 1 week at room temperature, the latter value changes to −40.0.

EXAMPLE 3

Chitosan from Dungeness crab shells is dissolved in 2% aqueous acetic acid at a w/v concentration of 1% using the procedure of Example 1. The solution pH value is 3.62 and the viscosity is 20.0 cps at 22.5° C. In 3 days the specific rotation changes from +25.0 to −16.0 and remains constant for another 7 days; the viscosity is reduced to 17.5 cps at 26° C. after 10 days.

EXAMPLE 4

Another sample of Dungeness crab chitosan, at 1% w/v concentration in 2% acetic acid, shows a higher viscosity (205 cps. at 25.5° C.) and an initial specific rotation of +38.8, which changes to −22.2 after 2 weeks and is constant for 2 more weeks.

EXAMPLE 5

A 1% w/v solution of Dungeness crab chitosan in 2% aqueous glycollic acid is prepared by the procedure of Example 1. This solution has a pH of 2.72 and a viscosity of 18 cps. at 27° C. Initially specific rotation is +14.0, and it is −21.4 after 1 week.

EXAMPLE 6

Dungeness crab chitosan is dissolved at 1% w/v concentration in 1% pyruvic acid by a procedure similar to that of Example 1, except that the chitosan is dispersed first in aqueous sodium pyruvate and then soublized by titrating with 0.1 N HCl to pH 2.3. Solution viscosity is 12.5 cps. at 26° C. and initial specific rotation is +10.0. After 1 week at room temperature the latter value changes to −10.0.

EXAMPLE 7

Dungeness crab chitosan is dissolved at a 1% w/v concentration in a 0.2 M acetic acid/sodium acetate buffer solution, using the procedure of Example 1. Solution pH is 4.87 and solution viscosity is 23 cps. at 22° C. Initial specific rotation is +5.0; after 1 week at room temperature it is −25.0.

EXAMPLE 8

Renatured Chitosan Films

A sample of high viscosity chitosan was dissolved in 4% acetic acid to make a 2% w/v solution, which was filtered and allowed to stand at room temperature for eleven days. To prepare a film, the highly viscous solution was poured onto a Teflon-coated plate and allowed to evaporate at 16° C.; additional solution was added to the evaporating pool every 12 hours during a period of 2.5 days. The system was then allowed to dry completely over a period of several days, after which the film peeled readily. The film was nearly transparent, tough and horny, but pliable and capable of being creased without breaking. The film acted as a retardation plate and in conjunction with a standard polarizing film, it gave improved contrast in viewing a light-colored mark on a mirrored surface at a reflected angle of 15°–20° (incident light at a similar angle; total angle of 30°–40°). A film sample cut from an inner area to avoid edge strain showed polarization between crossed Polaroids; that is, there was light transmitted at film positions angular to the Polaroids and the film appeared dark when aligned with one of the Polaroids.

Chemically this film is a chitosan partial acetate; that is, the free amine groups form a salt with acetic acid, and a polymeric salt results. However, the salt slowly loses acetic acid over a period of a few weeks and the film becomes insoluble in water although still soluble in dilute acetic acid. Filaments cut from the film were quite strong and were knotted without breakage.

Part of the chitosan acetate film 0.03 mm thick was immersed in dilute aqueous sodium bicarbonate for an hour to neutralize the acetic acid and regenerate the chitosan film as the free base. The resultant film swelled to about twice its original size and was quite fragile, but after washing with water and drying it returned to its original dimensions and regained its tough, horny character.

A thicker sample of chitosan acetate film 0.3 mm thick was neutralized with dilute ammonia; much less swelling was encountered and on washing and drying a very tough film was again obtained; it appeared stronger and tougher than the original chitosan acetate film.

EXAMPLE 9

Renatured Chitosan Filaments

To obtain filaments a 0.3 mm thick, chitosan acetate film prepared as in Example 9 was cut into strips of about the same width. The cut strips were immersed in dilute ammonium hydroxide for 2.5 hours, the liquid decanted and the filaments washed thoroughly with water. A water-softened renatured chitosan filament was stretched to 50% elongation; it was quite elastic and retracted 60% of the stretch when relaxed; on drying it retracted all of the stretch and shrank slightly beyond that. The dried filament was quite strong; an overhand knot was tied in it readily without breakage. The filament was birefringent as observed between crossed Polaroids but there was no sharp extinction along the fiber axis; residual strain was indicated.

In an alternate treatment, a renatured dry chitosan filament was wet for 30 minutes, elongated 50% and the filament held in stretched condition until dry. This filament was also tough, but between crossed Polaroids it showed almost complete extinction with the fiber axis parallel to the incident polarized light and high light transmission in the 45° position, indicating a substantial degree of molecular alignment along the fiber axis. On thorough wetting and subsequent drying under relaxed condition the filament recovered about 125% from the stretch, indicating that the original filament contained some recoverable elongation. The treated filament was flexible and strong, and between crossed Polaroids showed some retention of molecular alignment along the fiber axis.

EXAMPLE 10

Variation of Chitosan Film Properties with Time of Solution

To illustrate the variation in chitosan solution and film properties with the time of solution, a 500 ml 1% w/v stock solution of high viscosity chitosan in 4% acetic acid was prepared. This was accomplished by mixing 5.0 g of the dry, flake chitosan with 500.0 ml of 4% acetic acid, and warming it at 40° C. and allowing the mix to stir overnight (approximately 16 hrs). At the end of this time, the solution was centrifuged and filtered through wool felt to remove undissolved materials and solid impurities. The solution formed was extremely viscous and had an initial pH of 3.43.

The solution was then allowed to stand for the balance of 24 hours at which time a series of physical and chemical analyses commenced upon the solution and chitosan films prepared from the solution. The films were formed by allowing a portion of the solution to coalesce on glass with the acetic acid solvent being evaporated by a stream of dry air. The analyses, successively run after 1 day, 2 days, 3 days, 1 week and 2 weeks, included measurement of solution pH, solution viscosity, optical rotation as well as the film forming capacity of the solution and the tensile strength of the renatured chitosan films. Solution pH was 4.04 after 1 day and 3.96 after 2 weeks.

The results summarized below demonstrate that films having very substantial tensile strengths can be made from chitosan solutions aged long enough to invert their optical activities well over to the negative side. It is very surprising that the film tensile strength loss is only 28.4% in the 2 weeks required to obtain a high negative optical activity, while the solution viscosity drops 80%. After the solution aged for a month, films prepared by casting and solvent evaporation were clear, tough and flexible; Maltese crosses were observed with a polarizing microscope at magnifications of 64× and 160×, indicating the presence of spherulitic chitosan crystalline material.

| Time of Solution (Days) | Viscosity (Brookfield CPS) | Specific Rotation of Solution | Tensile Strength of film (kg/mm 2) |
| --- | --- | --- | --- |
| 1 | 4300 | +65 | 23.6 |
| 2 | 3900 | +20 | 20.5 |
| 3 | 1300 | 0 | 17.8 |
| 7 | 1200 | −5 | 17.2 |
| 14 | 850 | −20 | 16.9 |

The 14 day film showed activity as a retardation plate. On observing the very bright sun glare from a chrome strip on an automobile through a combination of this film and a polarizing film, it was noted that the glare was eliminated without decreasing the clarity of the viewed field.

Thus, the technique of this invention, i.e. controlling both pH of the solution and aging time, affords a superior method for obtaining uniformity of product film and substantial leeway in allowable holding time, or "shelf life", of chitosan processing solutions. It may be that the ordering of the molecules in solution, with better film-forming propensity, compensates for the polymer degradation indicated by decrease in solution viscosity.

While particular examples of the present invention have been shown and described, it is apparent that changes and modification may be made herein without departing from the invention in its broadest aspects. The aim of the appended claims, therefore, is to cover all such changes and modifications as fall within the true spirit and scope of the invention.

I claim:

1. The process for preparing renatured chitosan having an optical rotation as measured in solution at least 20% more negative than that of untreated chitosan which comprises mixing chitosan at room temperature with an aqueous, organic acid at a pH of about 2.0–5.5 until substantially all of the chitosan has dissolved, and allowing the solution to stand at room temperature for about 2–14 days, until the optical activity shifts toward the negative by at least about 20% and thereafter recovering renatured chitosan from the solution.

2. The process of claim 1 in which the solution has a pH in the range of about 2.3–4.9.

3. The process of claim 1 in which the acid is selected from the group consisting of acetic, glycollic and pyruvic acids.

4. The process of claim 1 in which the solution is neutralized with alkali to precipitate the renatured chitosan.

5. The process of claim 1 in which a material is added to the solution which is miscible with the acid solution but is a non-solvent for chitosan, thereby coagulating the chitosan in the form of a shaped article.

* * * * *